No. 809,568. PATENTED JAN. 9, 1906.
S. W. HURLBURT.
CLOTHES PIN BASKET.
APPLICATION FILED OCT. 7, 1904.
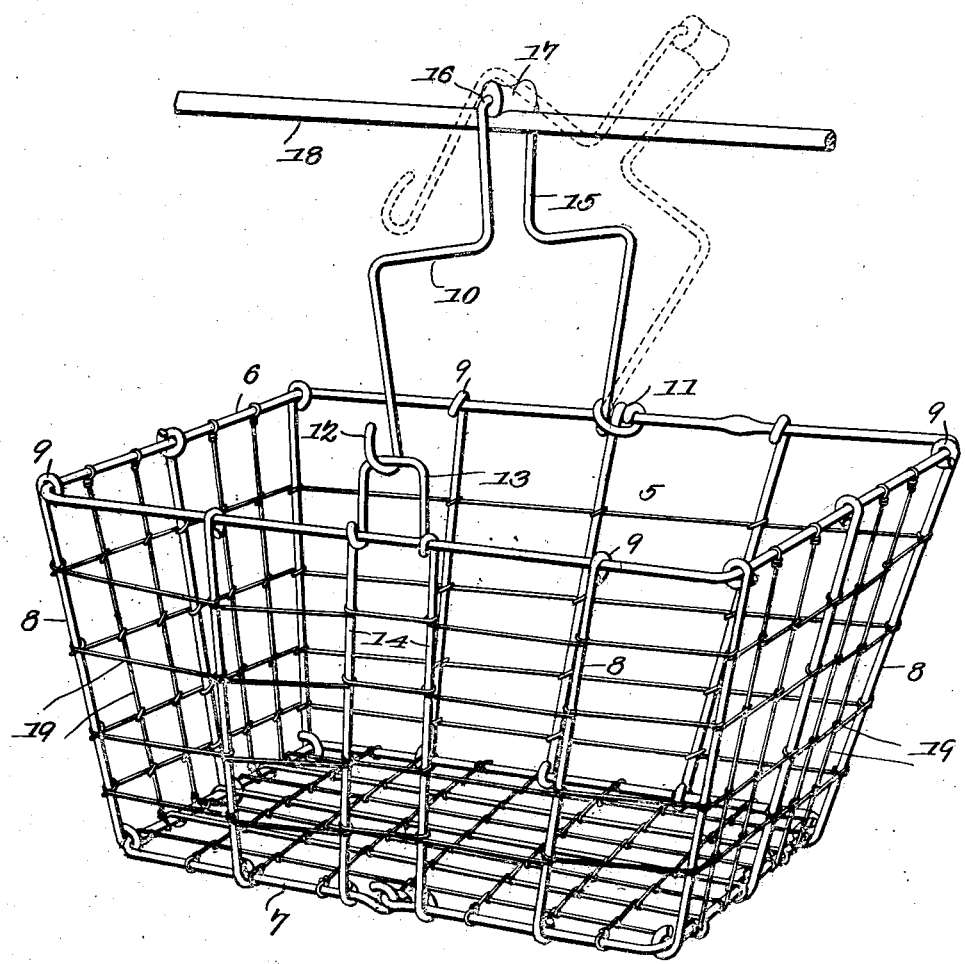
Witnesses
Samuel W. Hurlburt,
Inventor

UNITED STATES PATENT OFFICE.

SAMUEL W. HURLBURT, OF CRESTON, IOWA, ASSIGNOR OF ONE-HALF TO LANSING W. HURLBURT, OF CRESTON, IOWA.

CLOTHES-PIN BASKET.

No. 809,568.     Specification of Letters Patent.     Patented Jan. 9, 1906.

Application filed October 7, 1904. Serial No. 227,582.

*To all whom it may concern:*

Be it known that I, SAMUEL W. HURLBURT, a citizen of the United States, residing at Creston, in the county of Union and State of Iowa, have invented a new and useful Clothes-Pin Basket, of which the following is a specification.

This invention relates to an improved clothes-pin basket or holder, and has for its object to provide a simple, inexpensive, and efficient device of this character which may be readily suspended from and adjusted on the line, so as to facilitate the operation of suspending and detaching the clothes.

A further object of the invention is to provide a light portable basket the handle of which is pivoted, so as to permit the basket to be readily detached from one clothes-line and quickly placed in position on another when the occasion requires.

A still further object is to form the pivoted handle with a centrally-disposed upwardly-extending loop or guard in which is journaled a wheel or roller, said loop serving to prevent accidental displacement of the clothes-line while at the same time permitting the basket to be conveniently held in the hand and transported from place to place.

The invention consists in the construction and novel combination and arrangement of parts hereinafter fully described, illustrated in the accompanying drawing, and pointed out in the claims hereto appended, it being understood that various changes in form, proportion, and minor details of construction may be resorted to without departing from the principle or sacrificing any of the advantages of this invention.

The accompanying drawing illustrates a perspective view of the improved clothes-pin basket or holder, showing the same suspended from a clothes-line.

The device in its preferred form consists of a receptacle 5, preferably formed of metal, as shown, and comprising a pair of spaced horizontal wire frames 6 and 7, connected by a plurality of vertical stay-wires 8, the ends of which are twisted or otherwise fastened around the frames, as indicated at 9. Pivoted on one of the side bars of the upper frame 6 is a handle 10, also preferably formed of wire, one end of which is twisted around said bar on each side of one of the vertical stays, as indicated at 11, and the opposite end thereof bent to form a terminal hook 12, adapted to engage a keeper 13, the latter being preferably formed by extending the connected ends of the intermediate stay-wires 14 above the top of the frame 6, as shown.

Attention is here directed to the fact that while the handle 10 has a free pivotal movement on the side bar of the frame 6 said handle is effectually prevented from moving longitudinally on the frame by engagement with the twisted end of the stay-wire. The intermediate portion of the handle 10 is bent to form an upwardly-extending centrally-disposed loop or guard 15, on the cross-bar 16 of which is journaled a wheel or roller 17, adapted to engage the clothes-line 18, so as to permit the basket to slide freely thereon in suspending or detaching the clothes.

By having the loop or guard formed in the handle, as shown, the line is always retained in engagement with the roller when the handle is locked, while by having the handle extend in a horizontal plane on each side of said loop said handle may be readily grasped by the hand when transporting the basket from place to place without danger of the hand coming in contact with the roller.

The frame of the receptacle 5 is preferably provided with a series of interwoven wires 19 to prevent the clothes-pins from dropping out.

When it is desired to hang out clothes, the basket is filled with pins and placed on the line by releasing the handle and introducing the line between the side bars of the loop or guard and securing said handle, thereby causing the roller to engage the line and permit the basket to slide freely on the latter to any desired position. By releasing the hook from the keeper 13 the handle may be tilted rearwardly, as indicated in dotted lines, and the basket readily removed and placed on another line when the occasion demands.

From the foregoing it is apparent that there is produced a comparatively simple and inexpensive device admirably adapted for the attainment of the ends in view.

Having thus described the invention, what is claimed is—

1. A device of the class described comprising a receptacle, a handle pivoted to the receptacle and having its free end provided with a terminal hook adapted to detachably engage the receptacle and its intermediate portion bent upwardly beyond the general plane of the top of said handle to form a loop adapted to receive the clothes-line, said handle extending in a substantially horizontal plane on each side of the loop, and a roller journaled on the handle at said loop.

2. A device of the class described comprising a receptacle formed of an upper and lower horizontal frame connected by vertical stays, a handle having one end thereof pivoted to the upper frame and engaging each side of one vertical stay and its opposite end provided with a terminal hook, the intermediate portion of said handle being bent to form an upwardly-extending loop provided with a roller, and a keeper adapted to engage the terminal hook of the handle and formed by extending the intermediate pair of stays on one side of the basket above the general plane of the upper frame.

In testimony that I claim the foregoing as my own I have hereto affixed my signature in the presence of two witnesses.

SAMUEL W. HURLBURT.

Witnesses:
 F. M. ABBOTT,
 F. H. SCHERER.